United States Patent [19]

Ewing

[11] 3,713,685
[45] Jan. 30, 1973

[54] FLEXIBLE ACTUATOR
[75] Inventor: Donald D. Ewing, Akron, Ohio
[73] Assignee: The B.F. Goodrich Company, New York, N.Y.
[22] Filed: Oct. 29, 1970
[21] Appl. No.: 85,197

[52] U.S. Cl. .....................294/99 R, 3/1.2, 294/86 R
[51] Int. Cl. ...............................................B66c 1/46
[58] Field of Search .........294/1, 63 A, 86, 99 R; 3/1, 3/1.2, 12, 12.8, 12.7; 46/126; 92/37, 45, 46, 47, 91, 92

[56] References Cited

UNITED STATES PATENTS

| 3,601,442 | 8/1971 | Orndorff | 294/99 R |
| 3,343,864 | 9/1967 | Baer | 294/99 R |
| 2,733,545 | 2/1956 | Guadagna | 46/126 |

FOREIGN PATENTS OR APPLICATIONS 318,851   6/1917   Germany........................3/1.2

Primary Examiner—Evon C. Blunk
Assistant Examiner—Johnny D. Cherry
Attorney—W. A. Shira, Jr. and Joseph Januszkiewicz

[57] ABSTRACT

A tubular flexible actuator disposed in a generally U-shaped configuration with at least a portion of the legs of the actuator formed of elastomeric material with a common side of each leg having less than one-half the transverse periphery thereof reinforced with an inextensible but flexible longitudinal member. The ends of the actuator are connected to a source of fluid under pressure so that upon internal pressurization of the actuator it curls about the sides having the inextensible member.

12 Claims, 6 Drawing Figures

INVENTOR.
DONALD D. EWING
BY W. A. Shira, Jr.
ATTY.

INVENTOR.
DONALD D. EWING 3,713,685

FLEXIBLE ACTUATOR

BACKGROUND OF THE INVENTION

In providing force assistance for devices used in material handling it has been heretofore commonplace to rely upon mechanical linkages and/or fluid pressure actuated cylinders. In many applications where it is required to provide variable force assistance through a limited movement, or stroke, such mechanical and/or fluid pressure devices have heretofore been extremely complicated and unwieldy.

Attempts have been made to provide flexible pneumatic force assisting actuators and grappling devices by providing differential extensibility for portions of flexible tubes, subjected to internal pressurization, such that the portion of the tube having the greater extensibility permits the tube to curl upon pressurization. Devices of this nature provide for a flexible "finger" which is initially linear but curls or wraps about an object upon internal pressurization, with the amount of curling controlled by the pressure supplied therein. A plurality of such fingers may be interconnected with a common pressure manifold for simultaneous actuation, or curling, upon pressurization of the manifold, thus making a device capable of grasping an object. However, in making such devices, it has been found difficult to provide a structure for the flexible finger which curls in one plane, in other words, in a single direction. In such an actuator, each individual finger has a tendency to spiral helically or "corkscrew" laterally as it curls. This helical or corkscrew motion renders it difficult to use curling finger actuators in applications where it is required that the motion of the finger be in one plane and exhibit a precisely controlled amount of movement which is repeatable with a great degree of accuracy. Therefore, it has been desirable to find some means of providing a fluid pressure actuated flexible finger which has its curling motion capable of precise control in a single plane and one which may be cycled successively with a high degree of repeatability.

SUMMARY OF THE PRESENT INVENTION

The present invention provides a solution to the above-described problem of limiting the motion of a fluid pressure curling actuator such that the actuator has precise planar motion and a high degree of repeatability from one successive cycle of pressurization and depressurization to the next cycle. The present device provides a flexible tube generally U-shaped with the two legs preferably parallel and the ends thereof interconnected to a common fluid pressure manifold. Each leg of the U-shaped tube thus formed has portions of the wall of each leg, not exceeding half the transverse periphery thereof, reinforced on a common side. This reinforcement comprises longitudinally inextensible but flexible members forming a part of and preferably embedded in the wall of the tube along the length thereof, thereby rendering the portion so reinforced less extensible in the longitudinal direction than the remaining portions of the tube. Upon pressurization, the U-shaped tube is caused to curl about an axis parallel to the plane of the U-shaped and perpendicular to the legs with the inextensible members on the inner periphery of the curl.

DETAILED DESCRIPTION

Figure 1:
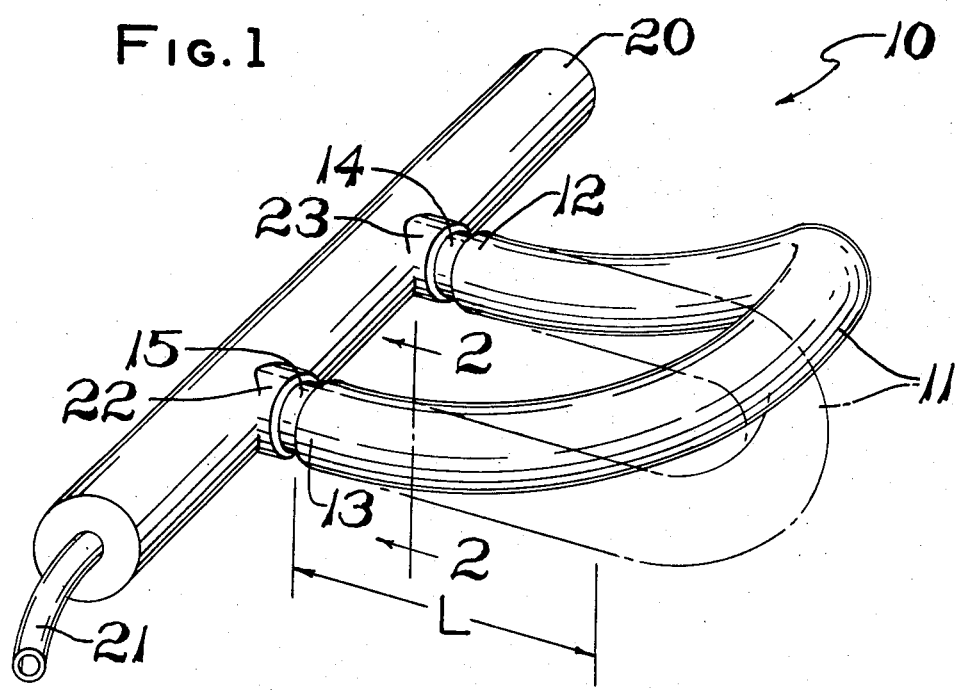
FIG. 1 is a perspective view of the presently preferred embodiment of the actuator illustrating the U-shaped tube connected to a pressure manifold with the actuated condition shown in solid black line and the unpressurized state illustrated in broken lines.

Referring now to FIG. 1, the assembled actuator 10 in its preferred form is illustrated in solid black line in the pressurized, or actuated, gripping state. The actuator 10 employs an elastic tube 11 formed in a U-shaped configuration with the legs of the U-shape being disposed in spaced parallel relationship. The ends 12 and 13 respectively of the U-shaped tube each have a fitting 14 and 15 respectively attached thereto in a fluid pressure sealing interconnection.

A rigid fluid pressure manifold 20, formed in generally elongated tubular configuration, is provided with a fluid pressure-tight chamber formed therein with an inlet port 21 communicating with the interior of the chamber. A pair of fluid transfer ports, 22 and 23 respectively, are provided at suitable locations on the manifold 20, the ports 22 and 23 being disposed in spaced relationship corresponding with the distance between pressure fittings 14 and 15, respectively, on the ends of the U-shaped tube to which the transfer ports 22 and 23 are connected for communication with the interior pressure chamber of the manifold. In operation, when a pressurized fluid is applied to the inlet port 21 of the pressure manifold, the fluid enters, via ports 22 and 23, and pressurizes the interior of the flexible elastic tube 11.

Referring again to FIG. 1, the actuator is formed of a single length of elastomeric tube provided with the above described inextensible tension member and circumferential reinforcement provided in the wall thereof prior to vulcanization. The uncured elastomeric tube is preferably formed to the U-shape and vulcanized in this configuration; however, it will be understood that the tube may also be vulcanized in the generally linear state and subsequently formed to the U-shape. It will also be understood that in the embodiment of FIG. 1, the longitudinal tension member may, alternatively, extend continuously throughout the length of the U-shaped tube.

Figure 2:
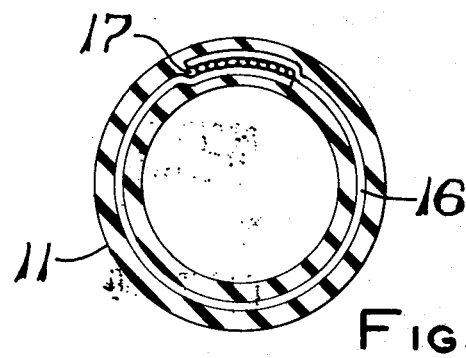
FIG. 2 is a transverse section of one leg of the tube taken along section indicating lines 2—2 of FIG. 1.

Referring now to FIG. 2, the preferred form of the tube 11 is illustrated in a manner showing the details of the construction of the tube wall. As mentioned above, the hollow tube is formed of rubber, plasticized synthetic resin, or other elastomeric material having suitable flexibility and elasticity with the choice of the specific material being determined primarily by the conditions of the service application, such as the fluid pressure medium employed, the pressures to be used and the environment to which a tube will be exposed. Each leg of the tube, for a distance denoted by the block letter L in FIG. 1, has a portion of the tube wall, less than half the transverse periphery thereof, reinforced with a flexible inextensible tension resistant member 17, which member is disposed on a common side of each tube leg along the length thereof in the plane formed by the legs of the tube and adjacent that side of the U-shaped tube about which it is desired for the actuator to curl.

Referring again to FIG. 2, the tube has a circumferential reinforcement 16 embedded therein which reinforcement comprises a layer of substantially weftless fabric having the warp threads or cords running circumferentially of each of the tube legs. The longitudinal ends of the fabric layer 16 are circumferentially overlapping in the region of the tube forming the side about which the actuator is intended to curl. The circumferential reinforcement fabric layer 16 extends continuously throughout the entire length of the U-shaped tube 11. In the preferred practice of the invention, the longitudinal tension member 17 is disposed radially intermediate the over lapping ends of the circumferential reinforcement 16 such that the tension member 17 is sandwiched between the overlapping ends of the elastic fabric 16.

In the preferred practice of the invention, the longitudinal tension member 17 comprises a strip of elastomer having a plurality of weftless substantially inextensible reinforcing cords embedded therein with the cords disposed longitudinally of the tube. It will be apparent that alternative forms of the tension member 17 may be employed as, for example, a thin flexible strip of metal instead of the plurality of inextensible cords. It will also be apparent that the cords in tension member 17 may be made of various materials as, for example, textile, stranded wire or fiberglass, with the choice of materials being dependent on the internal fluid pressure required for a particular service application and the size and thickness of the tube wall required to withstand the necessary operating fluid pressure within the tube. The particular tube structure illustrated in FIG. 2 is that used preferably for tubes having a diameter of 1 inch or less. For larger tubes, multiple layers of circumferential reinforcement and multiple layers of the tension member 17 may be employed to provide the necessary structural integrity of the tube for use with the higher operating pressures encountered in applications requiring the larger actuators for heavier gripping loads. It will be understood, therefore, that the single layer construction, as illustrated in the drawings, is presented only for clarity and simplicity of illustration and the tube wall structure of the present invention is not intended to be limited to a single layer of reinforcement.

In operation, when fluid pressure is applied to the inlet 21 of the manifold 20, and hence to the interior of the tube 11, via transfer ports 22 and 23, the tube is caused to curl about the side of the tube having the tension members 17 with the remaining portions of the periphery of the tube legs being longitudinally extensible by virtue of elastomeric material of the tube and the weftless nature of fabric 16. Upon release of the fluid pressure from the manifold, the tube returns to its initial configuration which is substantially planar as shown by the phantom outline in FIG. 1. In the present practice of the invention, the elastomeric tube 11 is vulcanized in the planar configuration. Thus, by alternatively pressurizing and depressurizing the manifold, the tube curls and straightens, respectively, with the maximum amount of movement of the tube being controllable and repeatable by the fluid pressure introduced into the manifold. Furthermore, the amount of curling of the tube may be varied within the maximum by controlling and varying the pressure in the manifold, with greater tube curling being experienced with greater pressure.

Figure 3:
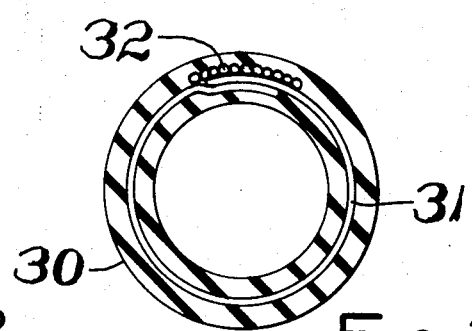
FIG. 3 is a view similar to FIG. 2 illustrating an alternative construction of the tube reinforcement.

Referring now to FIG. 3, another embodiment of the invention is illustrated in which the elastomeric tube 30, similar to the tube 11 of FIG. 1, has the portion of each leg, for the distance denoted by L in FIG. 1, reinforced with a tension member 32 which member is disposed radially outwardly of the circumferentially inelastic reinforcement layer 31. The layer of fabric 31 is similar to the reinforcement 16 of the embodiment of FIG. 2 in that fabric 31 is substantially weftless with the warp threads or cords being disposed circumferentially of the tube. The circumferentially inelastic fabric 31 extends continuously throughout the entire length of the tube; whereas, the inextensible reinforcement 32 is preferably provided only in the legs of the U-shape and for the distance denoted by dimension L in FIG. 1. It will be understood that although the tension member is illustrated as formed of a plurality of longitudinally extending weftless cords of inextensible material as, for example, metal or fiberglass, a continuous strip of homogenous inextensible material may be used. Furthermore, for larger tubes, as mentioned above with respect to the embodiment of FIG. 2, a plurality of layers of reinforcement 31 and 32 may be used.

Figure 4:
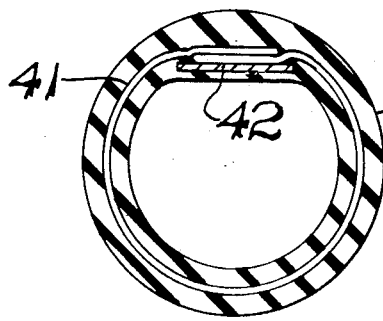
FIG. 4 is a view similar to FIG. 2, and shows another embodiment of the tube having a flat strip tension reinforcement radially inward of the circumferential reinforcement.

Referring now to FIG. 4, another embodiment of the invention is illustrated having reinforcement similar to the embodiment of FIG. 3 except that the tube 40 of FIG. 4 has a portion or section of the inner periphery of the tube formed to a straight line in transverse cross section thus forming a planar portion with the tension member disposed adjacent the planar portion in radially superposed relationship. The tube of FIG. 4 is illustrated as having a layer of circumferential reinforcement 41 which is formed of weftless fabric with the warp threads or cords extending circumferentially of the tube. The circumferential reinforcement is disposed in a layer embedded in the wall of the tube with the ends of the layer overlapping on the side of the tube about which it is desired that the tube curl. The circumferential reinforcement 41 extends continuously throughout the length of the tube. A tension resistant member 42 is provided and is illustrated as a single layer or strip of homogeneous inextensible material embedded in the wall of the tube in the side about which it is desired for the tube to curl which is positioned adjacent the planar portion of the inner periphery and radially inward of the circumferential reinforcement. The tension layer 42 preferably extends only in the legs of the tube and only for a distance denoted by the letter L in FIG. 1 similar to the embodiment of FIG. 3. It will be understood that although the tension resistant layer 42 is shown as a single layer or strip in FIG. 4 a plurality of superposed strips may be used or, alternatively, it may be formed of at least one layer of weftless cords as in the embodiment of FIG. 2. The embodiment of FIG. 4 may also have a plurality of layers of circumferential reinforcement 41 where such are desired for larger tubes. The embodiment of FIG. 4 in operation functions in a manner similar to the embodiment of FIG. 3.

Figure 5:
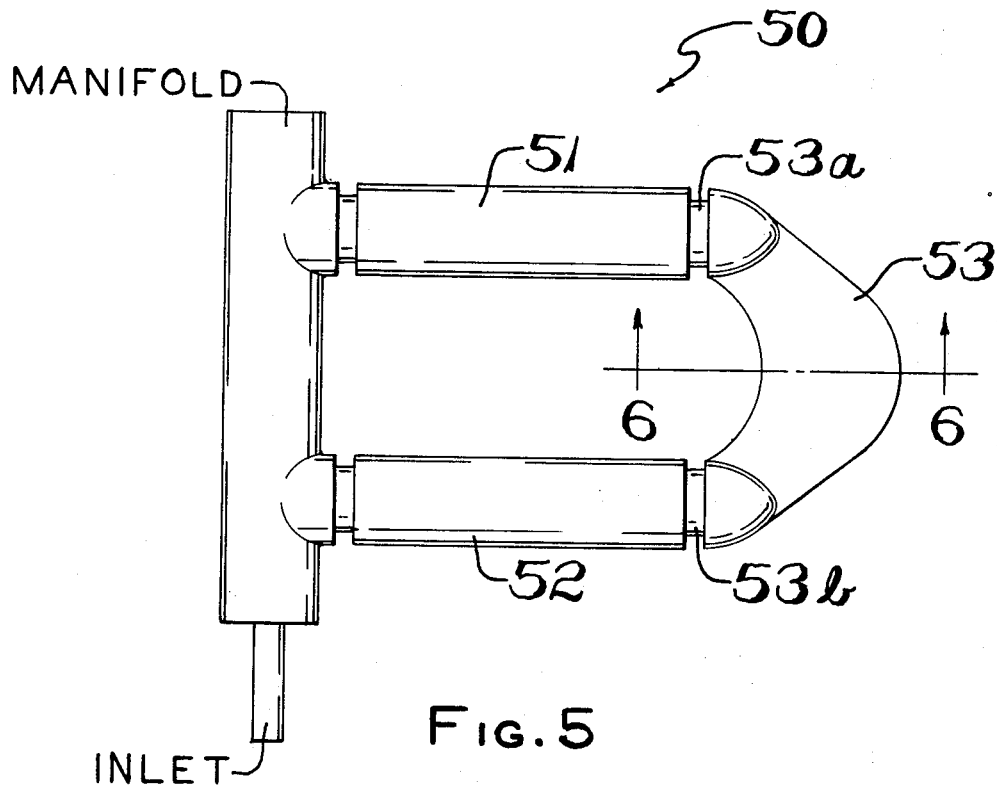
FIG. 5 is a plan view of another embodiment of the invention having the closed end of the U-shape formed of a solid rigid member attached to separate tubular legs; and, FIG. 6 is a section taken along section indicating lines 6—6 of FIG. 5.
Figure 6:
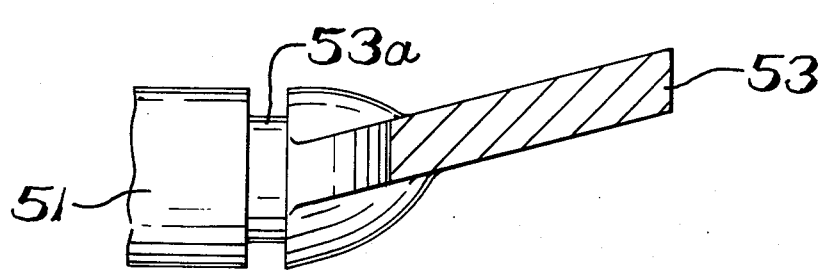

Referring now to FIG. 5, another embodiment of the actuator 50 is illustrated in which the leg portions 51,52 of the U-shape are formed of flexible, preferably elastic, tubing. The closed end of the actuator is formed of a rigid member 53 having a pair of spaced fittings 53a and 53b extending therefrom each respectively connected in a fluid pressure sealing manner to the free end of one of the flexible leg portions 51, 52. In the preferred practice of the invention, the embodiment of FIG. 5 has the member 53 formed of solid material throughout; however, a fluid passage (not shown) may be provided through member 53 for interconnecting fittings 53a and 53b and consequently the bores of the tubular leg portions 51,52.

The construction of the tubular leg portions 51,52 is of flexible, preferably elastic material such as an elastomer or plasticized synthetic resin. Each of the leg portions 51,52 has an inextensible tension resistant member (not illustrated) embedded in the wall thereof for less than one half the transverse periphery thereof so as to be disposed along a common side of the U-shape, and also has a layer of inextensible circumferential reinforcement embedded therein. The arrangement of the inextensible tension member and the circumferential layer may be similar to any one of the actuators illustrated in detail in FIGS. 2 – 4.

Modifications and adaptations of the invention will be apparent to those having ordinary skill in the art, the invention being limited only by the spirit and scope of the following claims.

I claim:

1. A flexible actuator comprising:
    a. an elongated member extending in a generally U-shape configuration with longitudinal portions adjacent each end thereof formed of tubularly shaped elastically flexible material, said portions each having a portion of the circumferential periphery with lesser longitudinal extensibility than the remainder thereof; and,
    b. a fluid pressure manifold having an inlet port and a pair of spaced transfer ports thereon with each of the opposite ends of said member connected respectively to one of said ports and with the said regions of lesser extensibility disposed in the same side of said member and on one side of the plane formed by said member, whereby the introduction of fluid pressure into said flexible tubular portions causes the latter to curl about a common axis parallel to said plane.

2. The actuator defined in claim 1, wherein said member has the portion intermediate said flexible portions formed of a rigid material.

3. The actuator defined in claim 1, wherein
    a. said flexible tubularly shaped portions are formed of elastic material; and,
    b. said portions of lesser longitudinal extensibility are formed of a substantially inextensible longitudinally extending tension member embedded in the wall of said tubular portions for less than one half the transverse periphery thereof.

4. The actuator defined in claim 3, wherein said tubular portions each have a layer of circumferentially extending inextensible reinforcement embedded therein which layer extends continuously throughout the length of said tubular portion.

5. The actuator defined in claim 3, wherein said inextensible tension member comprises at least one ply of a plurality of substantially weftless cords extending longitudinally of the tubular portions and disposed transversely in a row.

6. The actuator defined in claim 3, wherein said inextensible tension member comprises at least one generally flat strip elongated in transverse section formed of a homogeneous flexible yet inextensible material.

7. The actuator defined in claim 1, wherein the portion of said member intermediate said tubular end portions is formed in tubular shape such that said member has a continuous bore therethrough.

8. The actuator defined in claim 7, wherein
    a. said member is formed entirely of tubularly shaped elastic material; and,
    b. said portions of lesser longitudinal extensibility are each formed of a substantially inextensible longitudinally extending tension member embedded in the wall of said tubular portions for less than one half the transverse periphery thereof.

9. The actuator defined in claim 8, wherein said tubular member has at least one layer of circumferentially extending inextensible reinforcement embedded therein which layer extends continuously throughout the length of said tubular portion.

10. The actuator defined in claim 9, wherein said inextensible circumferential layer is overlapped in the region of said tension member.

11. The actuator defined in claim 10, wherein said tension member is disposed radially intermediate the overlapped ends of said inextensible circumferential layer.

12. The actuator defined in claim 11, wherein said circumferential reinforcement layer comprises substantially weftless textile cords with the warp extending circumferentially of the tube.

* * * * *